(12) United States Patent
Kumar

(10) Patent No.: US 11,080,903 B2
(45) Date of Patent: Aug. 3, 2021

(54) VISUALIZATION WITH CONDITIONAL CHARACTERISTIC

(71) Applicant: SAP SE, Walldorf (DE)

(72) Inventor: Viren Kumar, Vancouver (CA)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 15/372,741

(22) Filed: Dec. 8, 2016

(65) Prior Publication Data

US 2018/0165842 A1    Jun. 14, 2018

(51) Int. Cl.
*G06T 11/20* (2006.01)
*G06F 40/154* (2020.01)
*G06F 40/143* (2020.01)

(52) U.S. Cl.
CPC .......... *G06T 11/206* (2013.01); *G06F 40/143* (2020.01); *G06F 40/154* (2020.01)

(58) Field of Classification Search
CPC ............. G06T 11/206; G06F 17/30554; G06F 40/154; G06F 40/14; G06F 40/143
USPC ........................................................ 715/239
See application file for complete search history.

(56) References Cited

U.S. PATENT DOCUMENTS

| | | | | |
|---|---|---|---|---|
| 6,581,068 B1* | 6/2003 | Bensoussan | ...... | G06F 16/24539 |
| 2007/0143672 A1* | 6/2007 | Lipton | .................. | G06F 16/957 |
| | | | | 715/205 |
| 2010/0079459 A1* | 4/2010 | Breeds | .................. | G06T 11/206 |
| | | | | 345/440 |
| 2012/0005045 A1* | 1/2012 | Baker | ................ | G06Q 30/0643 |
| | | | | 705/27.2 |
| 2015/0346972 A1* | 12/2015 | Boekling | ............... | G06T 11/206 |
| | | | | 703/2 |
| 2018/0032492 A1* | 2/2018 | Altshuller | ............. | G06F 40/169 |

OTHER PUBLICATIONS

"Fill between" by Mike Garrity, Oct. 13, 2015 https://blogs.mathworks.com/graphics/2015/10/13/fill-between (Year: 2015).*

* cited by examiner

*Primary Examiner* — Hope C Sheffield
(74) *Attorney, Agent, or Firm* — Buckley, Maschoff & Talwalkar LLC

(57) ABSTRACT

A system includes determination of a first series of data points, each data point of the first series of data points comprising one or more dimension values and a value of a first measure, determination of a second series of data points, each data point of the second series of data points comprising one or more dimension values and a value of a second measure, determination of a condition associated with a relation between the first measure and the second measure and with a visual characteristic, evaluation of the condition with respect to a first portion of the first series of data points and a first portion of the second series of data points, determination of a first visual characteristic of a first area of a visualization based on the evaluation of the condition and the visual characteristic associated with the condition, and generation of a visualization comprising a first visualization of the first series of data points, a second visualization of the second series of data points, and the first area, wherein the first area exhibits the first visual characteristic.

15 Claims, 9 Drawing Sheets

US 11,080,903 B2

VISUALIZATION WITH CONDITIONAL CHARACTERISTIC

BACKGROUND

Enterprise software systems receive, generate, and store data related to many aspects of an enterprise. Users operate reporting tools to access such data and display the data in useful formats, such as in graphic visualizations.

Reporting tools may interact with a semantic layer defining a set of objects. Each object associates one or more physical entities (e.g., a physical database table, associated columns of one or more database tables, etc.) of one or more data sources with user-friendly names. These objects may be classified as dimensions, along which one may want to perform an analysis or report (e.g., Year, Country, Product), or measures (e.g., Sales, Profit), whose values can be determined for a given combination of dimension values.

Conventional reporting tools provide many types of visualizations for graphically presenting values of one or more measures with respect to various combinations of dimension values. However, improved systems are desired to graphically represent relationships between the values of two or more measures within a visualization.

DETAILED DESCRIPTION

The following description is provided to enable any person in the art to make and use the described embodiments. Various modifications, however, will remain readily apparent to those in the art.

Generally, some embodiments provide efficient representation of relationships between the values of two or more measures within a data visualization. According to some embodiments, at least one characteristic of the visualization depends upon a condition associated with the values of two or more depicted measures.

Figure 1:
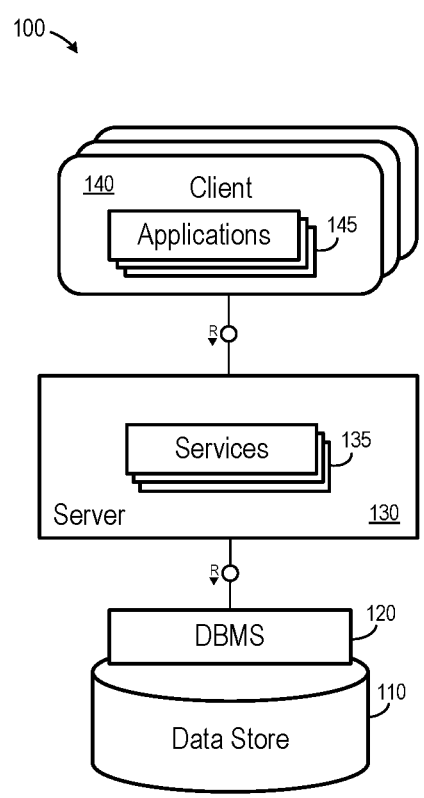
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface consisting of one or more dimensions and/or one or more measures. The query may also include other information such as filters. The application passes a request based on the query to one of services 135. An SQL script is generated based on the request and forwarded to DBMS 120. DBMS 120 executes the SQL script to return a result set based on data of data store 110, and the application 145 generates and displays a report/visualization based on the result set.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an XML document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As described above, system 100 includes metadata defining objects which are mapped to logical entities of data store 110. The metadata be stored in data store 110 and/or a separate repository (not shown). The metadata may include information regarding dimension names (e.g., Country, Year, Product), dimension hierarchies (e.g., Country>State>City), measure names (Profit, Units, Sales) and any other suitable metadata.

Each of clients 140 may comprise one or more devices executing program code of an application 145 for presenting user interfaces to allow interaction with server 130. The user interfaces of applications 145 may comprise user interfaces suited for reporting, data analysis, and/or any other functions based on the data of data store 110.

Presentation of a user interface as described herein may comprise any system to render visualizations. For example, a client 140 may execute a Web Browser to request and receive a Web page (e.g., in HTML format) from application server 130 via HTTP, HTTPS, and/or WebSocket, and may render and present the Web page according to known protocols. In another example, an application 145 may comprise a user interface component and an engine component. The user interface component transmits JavaScript calls to the engine component in response to user interactions and the engine component transmits corresponding HTTP calls to server 130. The engine component receives XML, HTML and/or JavaScript from server 130 in response, and provides corresponding HTML and custom style sheet (CSS) data to the user interface component for rendering thereby. Such an implementation may allow data exchange and presentation without requiring full page reloads.

Figure 2:
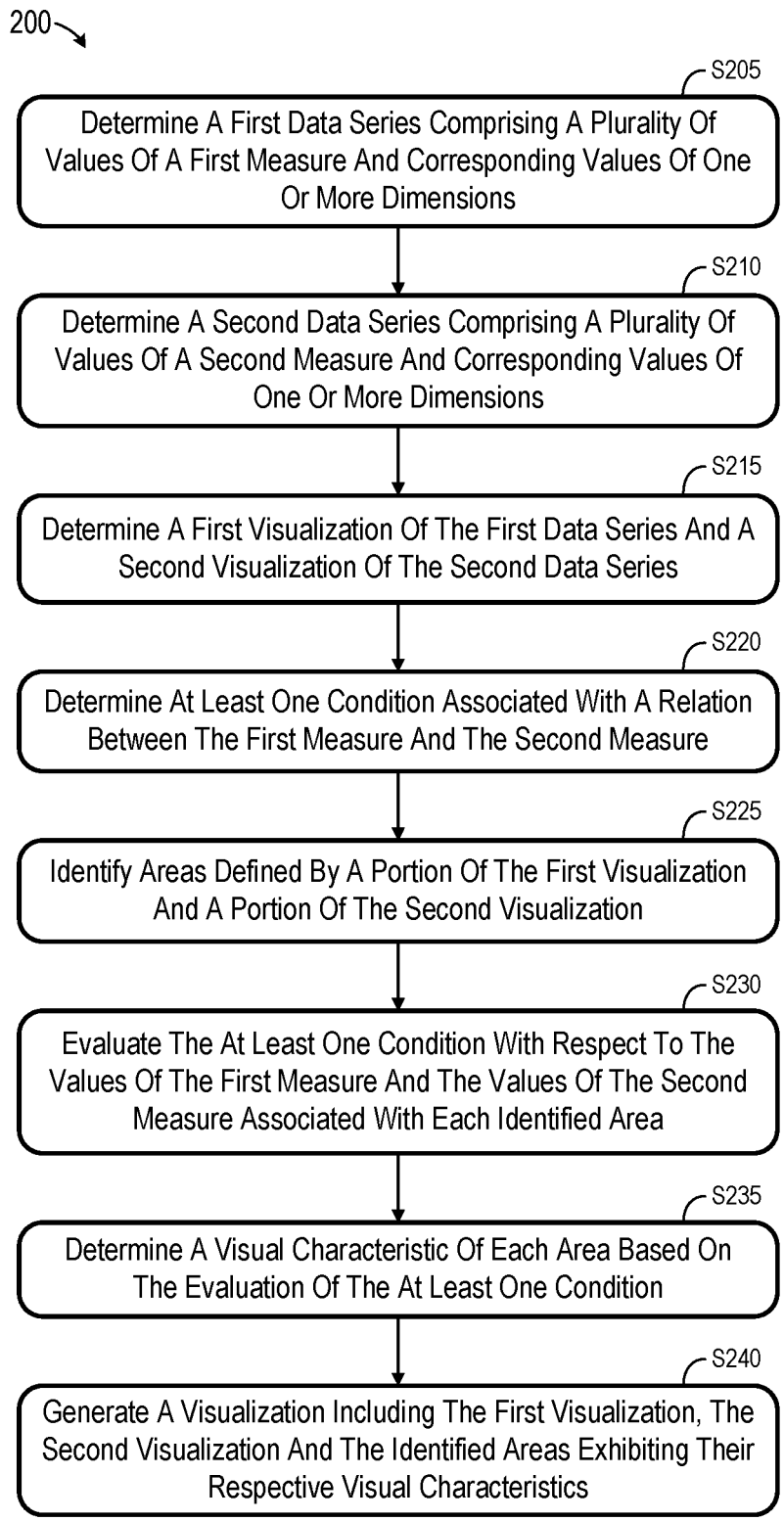
FIG. 2 is a flow diagram of a process according to some embodiments.

FIG. 2 comprises a flow diagram of process 200 according to some embodiments. Process 200 may be executed to generate a visualization whose characteristics are dependent upon the relationship between the values of two or more measures.

In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A first data series is determined at S205. The first data series includes a plurality of values of a first measure and corresponding values of a first one or more dimensions. For example, one data point of the first data series may comprise a first value of the measure Sales which corresponds to the dimension values Country: U.S.A.; Year: 2014; Product: Televisions. A second data point of the first data series may comprise a second value of the measure Sales which corresponds to the dimension values Country: U.S.A.; Year: 2015; Product: Televisions. Similarly, at S210, a second data series is determined which includes a plurality of values of a second measure and corresponding values of a second one or more dimensions.

The first one or more dimensions may be identical to or different from the second one or more dimensions according to some embodiments, and the corresponding values thereof may also be identical according to some embodiments. For example, a first data point of the second data series may comprise a first value of the measure Net Sales which corresponds to the dimension values Country: U.S.A.; Year: 2014; Product: Televisions, and a second data point of the second data series may comprise a second value of the measure Net Sales which corresponds to the dimension values Country: U.S.A.; Year: 2015; Product: Televisions.

Figure 3:
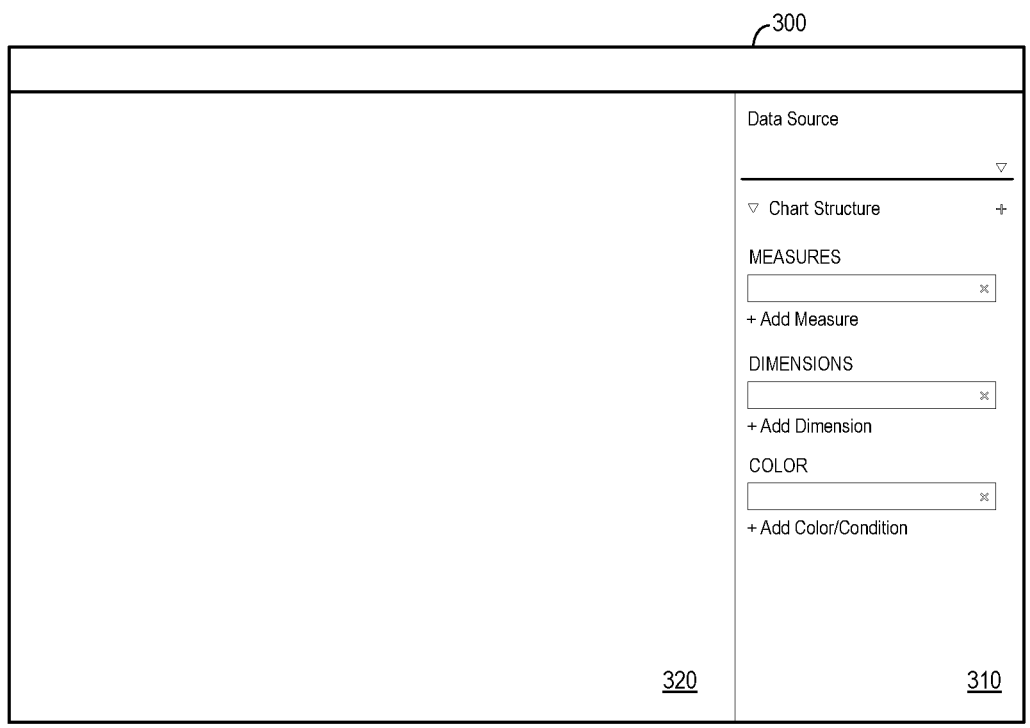
FIG. 3 is an outward view of a displayed user interface according to some embodiments.

According to some embodiments, the first measure, the second measure and the corresponding dimension values are determined based on input received from a user. FIG. 3 illustrates interface 300 to receive such input from a user according to some embodiments. Embodiments are not limited to interface 300. Interface 300 may comprise a Web page provided by server 130 in response to a request from a Web browser application 145 executing on client 140. Any client application 145 may be used to display interface 300, which is not limited to Web-based formats.

Interface 300 includes visualization definition area 310 to receive metadata of a visualization. Area 310 includes fields which allow a user to specify a data source, a chart structure (e.g., pie, line, bar, etc.), one or more measures, one or more dimensions, and color information. As will be described below, the color information may comprise one or more conditions based upon which areas of a resulting visualization will be colored. The conditions may be defined based on relationships between measure values.

Figure 4:
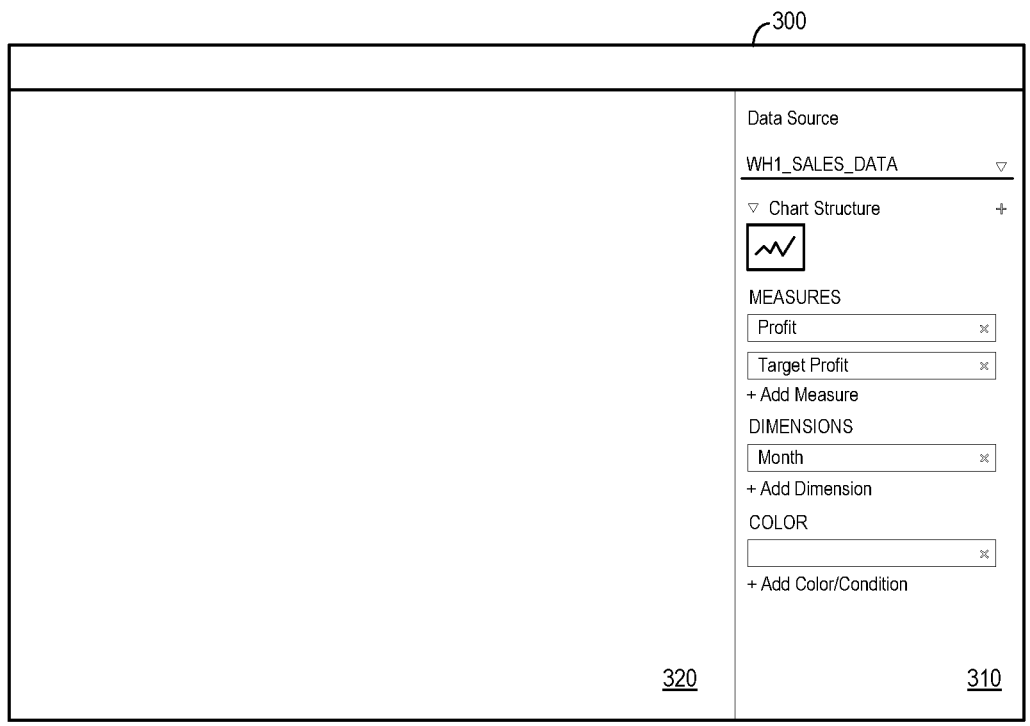
FIG. 4 is an outward view of a displayed user interface according to some embodiments.

FIG. 4 illustrates interface 300 after input of visualization metadata into area 310 according to some embodiments. A user has selected a data source, a line chart structure, the measures Profit and Target Profit and the Dimension month. Accordingly, area 310 defines a visualization which will include a first line representing the value of the measure Profit for each month represented in the data source, and a second line representing the value of the measure Target Profit for each month represented in the data source. With reference to process 200, the determined first data series according to area 310 of FIG. 4 may be (($Month_1$, $Profit_1$), ($Month_2$, $Profit_2$), . . . , ($Month_n$, $Profit_n$)), and the determined second data series may be (($Month_1$, Target $Profit_1$), ($Month_2$, Target $Profit_2$), . . . , ($Month_n$, Target $Profit_n$)). As mentioned above, the values of the Month dimension in each data series need not be identical according to some embodiments.

Next, at S215, a first visualization of the first data series and a second visualization of the second data series are determined. As described above, and according to some embodiments, server 130 may receive metadata defining the dimensions and measures of a query (e.g., the metadata input into area 310), generate an SQL script based on the metadata, and forward the script to DBMS 120. DBMS 120 executes the SQL script to return result sets to an application 145 based on data of data store 110 (e.g., the data associated with data source WH1_SALES_DATA), and the application 145 presents a visualization based on the result sets. The visualization may be rendered on server 130 or may be transmitted to client 140 as XML, HTML and JavaScript for rendering thereon as described above.

Figure 5:
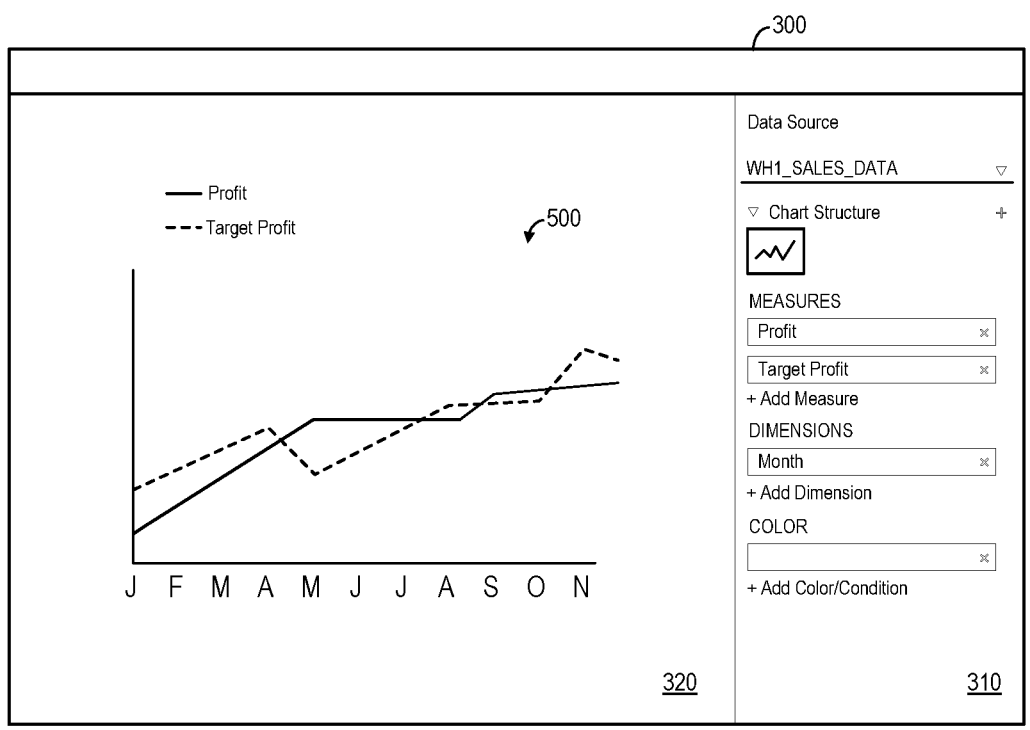
FIG. 5 is an outward view of a displayed user interface according to some embodiments.

FIG. 5 illustrates visualization 500 presented within area 320 of interface 300 according to some embodiments. Visualization 500 includes a solid line tracing data points of a data series associated with the Profit measure and a dotted line tracing points of a data series associated with a Target Profit measure.

Figure 6:
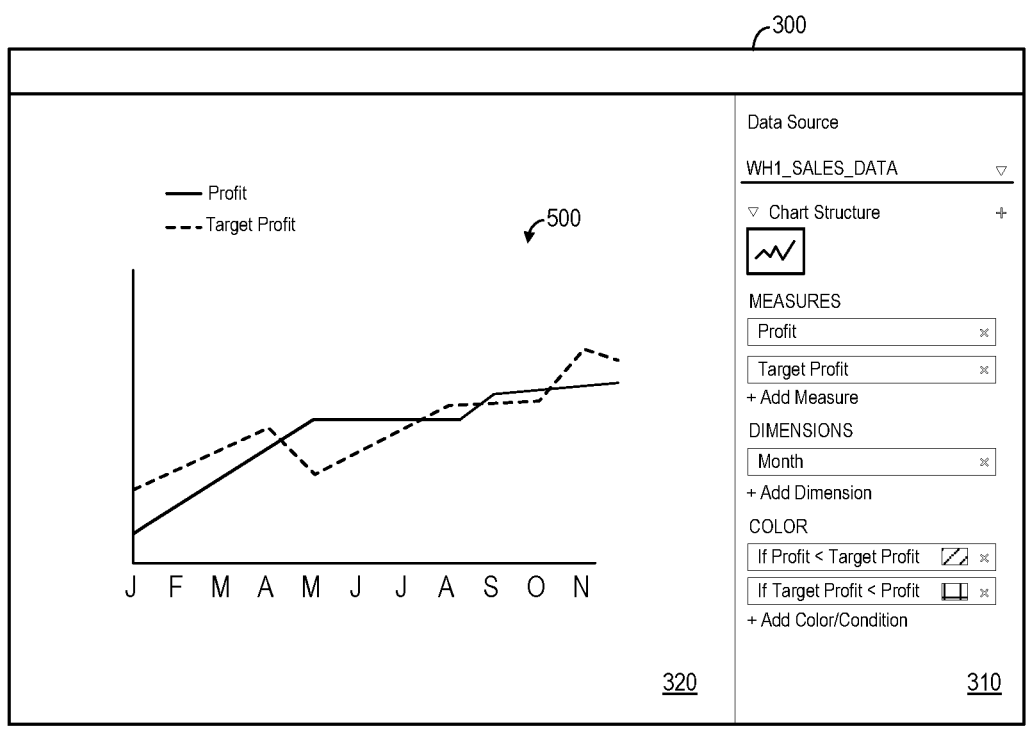
FIG. 6 is an outward view of a displayed user interface according to some embodiments.

At least one condition is determined at S220. The determined condition(s) are associated with a relation between the first measure and the second measure. FIG. 6 illustrates determination of conditions at S220 according to some embodiments. In particular, a user has manipulated area 310 to input two conditions. Each condition is associated with a visual characteristic, which in the present example is a color. In order to enable monochromatic duplication of the present document, the colors are represented herein as hatching patterns. Embodiments may associate any one or more types of visual characteristic with a condition, and may utilize any input metaphor for receiving a condition, its measure values, and its associated visual characteristic from a user.

According to the FIG. 6 example, a first color is associated with the condition "If Profit<Target Profit" and a second color is associated with the condition "If Target Profit<Profit". Conditions are not limited to two measures and may include other conditional operators, Boolean or other operators and actual values.

Figure 7:
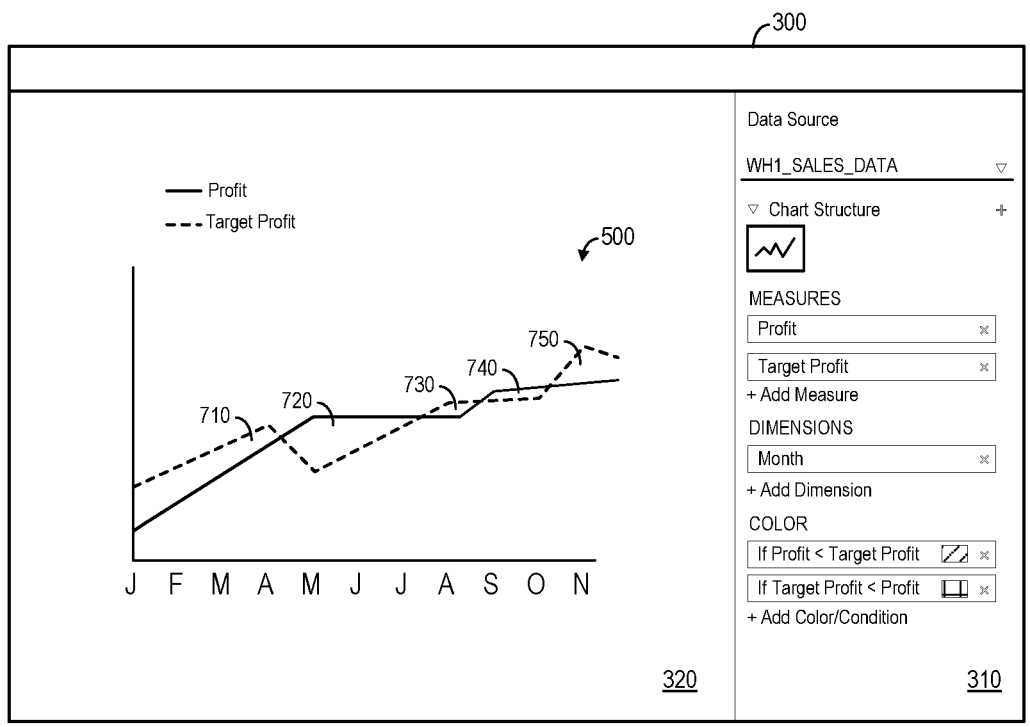
FIG. 7 is an outward view of a displayed user interface according to some embodiments.

After determining the conditions at S220 (e.g., by virtue of user input of the conditions into area 310 and a resulting JavaScript call which in turn results in an HTTP call to server 130), areas are identified which are defined by a portion of the first visualization and a portion of the second visualization. FIG. 7 illustrates identified areas 710-750 of visualization 500 according to some embodiments of S225. As shown, areas 710-750 are defined by a portion of the first visualization (i.e., the solid line representing the Profit measure) and a portion of the second visualization (i.e., the dashed line representing the Target Profit measure). According to some embodiments, the areas may be identified by determining the intersection points of the solid line and the dashed line and defining the areas as bounded by the intersection points and the lines. In the case of areas 710 and 750, these are defined as bound, respectively, by the y-axis, the two lines and the first intersection point, and by the last intersection point, the two lines and an imaginary vertical line at y=(month of last data point of data series).

Next, at S230, the at least one condition is evaluated with respect to the values of the first measure and the values of the second measure associated with each identified area. For example, the first condition "If Profit<Target Profit" is evaluated with respect to the Profit measure values bounding area 710 and the Target Profit measure values bounding area 710. Similarly, the second condition "If Target Profit<Profit" is evaluated with respect to the same measure values. In the present example, the first condition is True and the second condition is False with respect to area 710. Similar logic holds for areas 730 and 750. Conversely, the first condition is False and the second condition is True with respect to areas 720 and 740.

A visual characteristic is determined for each identified area based on the evaluation of the conditions. The visual characteristic may be determined based on the definition of the condition, as in the present example, or may be determined without user input in a pre-programmed manner to visually distinguish one area from another area. Accordingly, a visualization is generated at S240 including the first visualization, the second visualization and the identified areas. The identified areas are generated so as to exhibit their respective visual characteristics determined at S235.

Figure 8:
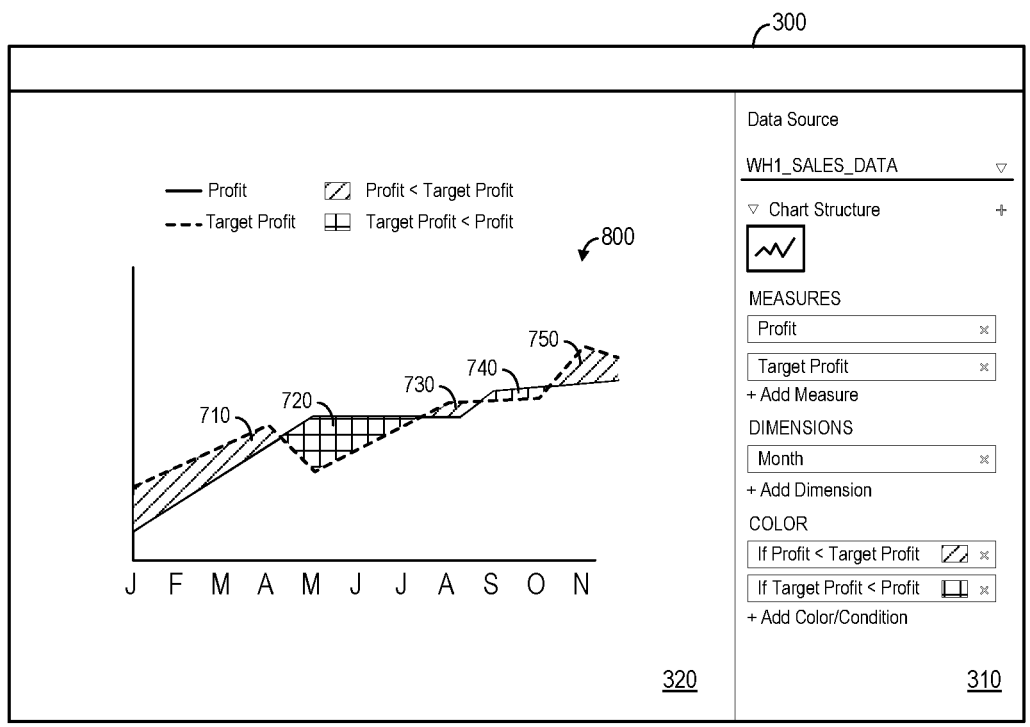
FIG. 8 is an outward view of a displayed user interface according to some embodiments.

FIG. 8 illustrates visualization 800 generated at S240 according to some embodiments. The hatching patterns of areas 710-750 may represent different colors, actual hatching patterns, or any other distinguishable visual characteristics. Interface 800 may be rendered on a client 140 based on JavaScript received from server 130, may be a static HTML page received from server 130, or may be completely generated on the client 140 based on the first data series and the second data series received from server 130 (i.e., S215-S240 are performed entirely on client 140).

Although the above description of process 200 includes generation and presentation of visualization 500 prior to determining the one or more conditions, the measures, dimensions and conditions may be received from a user prior to generation of any visualization according to some embodiments. That is, some embodiments may omit S215 and display of visualization 500 as described above.

Figure 9:
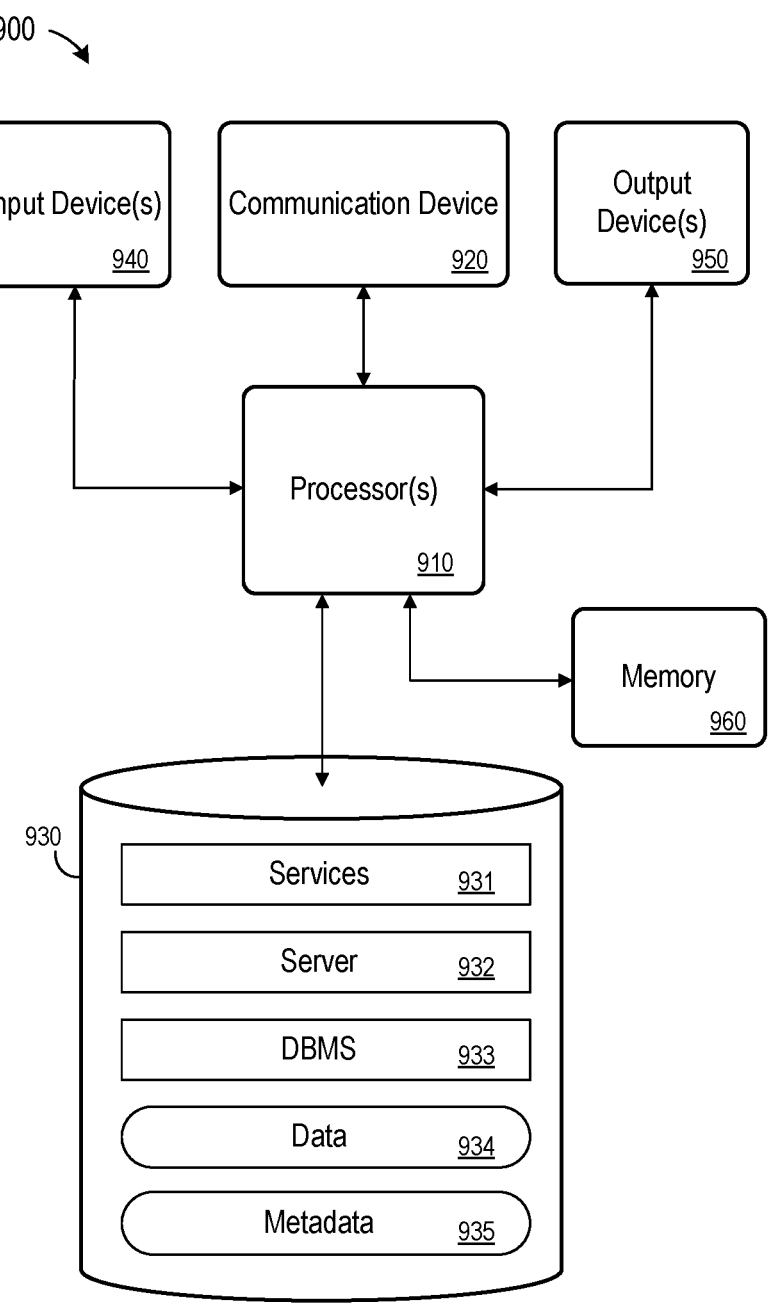
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of server 130, DBMS 120 and data store 110 of FIG. 1 in some embodiments. Apparatus 900 may include other unshown elements according to some embodiments.

Apparatus 900 includes processor(s) 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory.

Services 931, server 932 and DBMS 933 may comprise program code executed by processor 910 to cause apparatus 900 to perform any one or more of the processes described herein. Embodiments are not limited to execution of these processes by a single apparatus.

Data 934 and metadata 935 (either cached or a full database) may be stored in volatile memory such as memory 960. Metadata 935 may include information regarding dimensions, dimension values, and measure names associated with the data sources stored within data 934. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a user device including a browser application wherein the browser application contains a user interface component and an engine component, the browser application displaying a page on the browser application containing an input section and a display section, where conditions can be set in the input section, the user device to:
   receive, from a user in the input section, one or more dimension values;
   receive, from the user in the input section within one or more fields: a first measure, a second measure, a first condition including a first operator that defines a first relationship between the first measure and the second measure and a second condition including a second operator that defines a second relationship between the first measure and the second measure, and a first visual characteristic associated with the first condition and a second visual characteristic associated with the second condition; and
   transmit a request comprising the one or more dimension values and the received: first measure, second measure, first condition that defines the first relationship between the first measure and the second measure, second condition that defines the second relationship between the first measure and the second measure, the first visual characteristic associated with the first condition, and the second visual characteristic associated with the second condition; and
   a server device to:
   receive the one or more dimension values, and the received: first measure, second measure, first condi-
   tion that defines the first relationship between the first measure and the second measure, the second condition that defines the second relationship between the first measure and the second measure, the first visual characteristic associated with the first condition, and the second visual characteristic associated with the second condition;
   determine a first series of data points, each data point of the first series of data points comprising the one or more dimension values and a value of the first measure, wherein a dimension value is a hierarchical component of a dimension hierarchy, and the first measure is a numerical value to quantify the one or more dimension values;
   determine a second series of data points, each data point of the second series of data points comprising the one or more dimension values and a value of the second measure;
   determine a first visualization associated with the first series of data;
   determine a second visualization associated with the second series of data;
   determine a first area defined by a first portion of the first visualization and a first portion of the second visualization;
   determine an application of the first visual characteristic based on the first condition, one or more values of the first measure associated with the first portion of the first visualization, and one or more values of the second measure associated with the first portion of the second visualization;
   generate a combined visualization comprising the first visualization, the second visualization, and the first area, the first area exhibiting the application of the first visual characteristic;
   transmit, in response to the request, the combined visualization to the engine component of the application at the user device;
   provide corresponding HTML for the combined visualization at the engine component;
   transmit the corresponding HTML to the user interface component of the user device; and
   render the corresponding HTML via the user interface component within the display section without requiring a full re-load of the page.

2. A system according to claim 1, the server device to:
   determine a second area defined by a second portion of the first visualization and a second portion of the second visualization; and
   determine an application of the second visual characteristic based on the second condition, one or more values of the first measure associated with the second portion of the first visualization, and one or more values of the second measure associated with the second portion of the second visualization,
   wherein the generated combined visualization further comprises the second area, and
   wherein the second area exhibits the application of the second visual characteristic.

3. A system according to claim 1, wherein the generated combined visualization comprises XML code and JavaScript code.

4. A system according to claim 3, the user device further to:
   generate CSS code based on the XML code and JavaScript code.

5. A system according to claim 1, the server device further to:
- determine a second area defined by a second portion of the first visualization and a second portion of the second visualization;
- determine one of the application of the first visual characteristic and the second characteristic for the second area based on the first condition, the second condition, one or more values of the first measure associated with the second portion of the first visualization, and one or more values of the second measure associated with the second portion of the second visualization; and
- wherein the combined visualization further comprises the second area exhibiting the application of one of the first visual characteristic and the second visual characteristic.

6. A system comprising:
a memory storing processor-executable process steps; and
one or more processors to execute the processor-executable process steps to cause the system to:
- display a page in a browser application wherein the browser application contains a user interface component and an engine component, the page containing an input section and a display section, where conditions can be set in the input section;
- determine a first series of data points, each data point of the first series of data points comprising one or more dimension values and a value of a first measure, wherein a dimension value is a hierarchical component of a dimension hierarchy, and the first measure is a numerical value to quantify the one or more dimension values;
- determine a second series of data points, each data point of the second series of data points comprising one or more dimension values and a value of a second measure;
- receive, from a user, in the input section within one or more fields a first condition including a first operator that defines a first relationship between the first measure and the second measure, wherein the first condition is associated with a first visual characteristic;
- receive, from the user, in the input section within one or more fields a second condition including a second operator that defines a second relationship between the first measure and the second measure, wherein the second condition is associated with a second visual characteristic;
- transmit a request comprising the one or more dimension values and: the first measure, the second measure, the first condition that defines the first relationship between the first measure and the second measure, the second condition that defines the second relationship between the first measure and the second measure, the first visual characteristic associated with the first condition, and the second visual characteristic associated with the second condition;
- based on the request:
  - determine a first visualization associated with the first series of data;
  - determine a second visualization associated with the second series of data;
  - determine a first area defined by a first portion of the first visualization and a first portion of the second visualization;
  - determine an application of the first visual characteristic based on the first condition, one or more values of the first measure associated with the first portion of the first visualization, and one or more values of the second measure associated with the first portion of the second visualization;
  - generate a combined visualization comprising the first visualization, the second visualization, and the first area, wherein the first area exhibits the application of the first visual characteristic;
- transmit, in response to the request, the combined visualization to the engine component of the application;
- provide corresponding HTML for the combined visualization at the engine component;
- transmit the corresponding HTML to the user interface component of the user device; and
- render the corresponding HTML via the user interface component within the display section without requiring a full re-load of the page.

7. A system according to claim 6, the one or more processors to execute the processor-executable process steps to cause the system to:
- determine a second area defined by a second portion of the first visualization and a second portion of the second visualization; and
- determine an application of the second visual characteristic based on the second condition, one or more values of the first measure associated with the second portion of the first visualization, and one or more values of the second measure associated with the second portion of the second visualization,
- wherein the generated combined visualization further comprises the second area, and
- wherein the second area exhibits the application of the second visual characteristic.

8. A system according to claim 6, wherein the generated combined visualization comprises XML code and JavaScript code.

9. A system according to claim 8, the one or more processors to execute the processor-executable process steps to cause the system to:
- generate CSS code based on the XML code and JavaScript code.

10. A system according to claim 6, the one or more processors to execute the processor-executable process steps to cause the system to:
- determine a second area defined by a second portion of the first visualization and a second portion of the second visualization; and
- determine an application of one of the first visual characteristic and the second visual characteristic for the second area based on the first condition, the second condition, one or more values of the first measure associated with the second portion of the first visualization, and one or more values of the second measure associated with the second portion of the second visualization,
- wherein the combined visualization further comprises the second area, the first area exhibiting the application of the first visual characteristic and the second area exhibiting the application of one of the first visual characteristic and the second visual characteristic.

11. A computer-implemented method comprising:
displaying a page in a browser application wherein the browser application contains a user interface component and an engine component, the page containing an input section and a display section, where conditions can be set in the input section;

determining a first series of data points, each data point of the first series of data points comprising one or more dimension values and a value of a first measure, wherein a dimension value is a hierarchical component of a dimension hierarchy, and the first measure is a numerical value to quantify the one or more dimension values;

determining a second series of data points, each data point of the second series of data points comprising one or more dimension values and a value of the second measure;

receiving, from a user, in the input section within one or more fields a first condition including a first operator that defines a first relationship between the first measure and the second measure and, wherein the first condition is associated with a first visual characteristic;

receiving, from the user, in the input section within one or more fields a second condition including a second operator that defines a second relationship between the first measure and the second measure and, wherein the second condition is associated with a second visual characteristic;

transmit a request comprising the one or more dimension values and: the first measure, the second measure, the first condition that defines the first relationship between the first measure and the second measure, the second condition that defines the second relationship between the first measure and the second measure, the first visual characteristic associated with the first condition, and the second visual characteristic associated with the second condition;

based on the request:
  evaluating the first condition with respect to a first portion of the first series of data points and a first portion of the second series of data points;
  determining an application of the first visual characteristic of a first area of a first visualization based on the evaluation of the first condition and the first visual characteristic associated with the first condition;
  generating a combined visualization comprising the first visualization of the first series of data points, a second visualization of the second series of data points, and the first area, wherein the first area exhibits the application of the first visual characteristic;

transmitting, in response to the request, the combined visualization to the engine component of the application at the user device;

providing corresponding HTML for the combined visualization at the engine component;

transmitting the corresponding HTML to the user interface component; and rendering the corresponding HTML via the user interface component within the display section without requiring a full re-load of the page.

12. A method according to claim 11, further comprising:

evaluating the second condition with respect to a second portion of the first series of data points and a second portion of the second series of data points;

determining an application of the second visual characteristic of a second area of the second visualization based on the evaluation of the second condition with respect to the second portion of the first series of data points and the second portion of the second series of data points, and on the second visual characteristic associated with the second condition, wherein the generated combined visualization further comprises the second area, and wherein the second area exhibits the application of the second visual characteristic.

13. A method according to claim 11, wherein the generated combined visualization comprises XML code and JavaScript code.

14. A method according to claim 13, further comprising:

generating CSS code based on the XML code and JavaScript code.

15. A method according to claim 11, further comprising:

evaluating the first condition and the second condition with respect to a second portion of the first series of data points and a second portion of the second series of data points;

determining an application of one of the first visual characteristic and the second visual characteristic of a second area of the combined visualization based on the evaluation of the first condition, the second condition, the first visual characteristic associated with the first condition and the second visual characteristic associated with the second condition, wherein the combined visualization further comprises the second area, the first area exhibiting the application of the first visual characteristic and the second area exhibiting the application of one of the first visual characteristic and the second visual characteristic.

* * * * *